United States Patent Office 2,847,430
Patented Aug. 12, 1958

2,847,430

2-METHYLENE 3-KETO Δ⁴ STEROIDAL COMPOUNDS AND PROCESS TO MAKE THE SAME

Philip F. Beal III, Portage Township, Kalamazoo County, Mich., assignor to The Upjohn Company, Kalamazoo, Mich., a corporation of Michigan No Drawing. Application November 16, 1955
Serial No. 547,306

15 Claims. (Cl. 260—397.45)

This invention relates to novel steroids, more particularly to synthetic steroid hormones, to novel steroid intermediates in the production thereof, and a process for their production.

The novel compounds of the present invention and the process for their production may be represented by the following formulae:

thetic steroid hormones. Still another object is the provision of a process for the production of these synthetic steroid hormones. A further object is the provision of a process for the introduction of the methylene group into the cyclopentanopolyhydrophenanthrene nucleus of certain steroids. Other objects will be apparent to those skilled in the art to which this invention pertains.

According to the present invention, the known 11β,-21 - dihydroxy - 4,17(20) - pregnadien - 3 - one, 11α,21 - dihydroxy - 4,17(20) - pregnadien - 3 - one, 21 - hydroxy-4,17(20) - pregnadiene-3,11-dione, and 21-esters thereof are converted to the novel steroids of the present invention (V and VI) by the following reactions: first, glyoxalation, carboxylation, trifluoroacetylation or formylation to produce the starting 2-carbonyl derivatives thereof (I); second, condensation with formaldehyde to produce the corresponding 2-hydroxymethyl-2-carbonyl compound (II); third, removal of the 2-carbonyl group to produce a 2-hydroxymethyl compound which then dehydrates to produce a 2-methylene compound (IV);

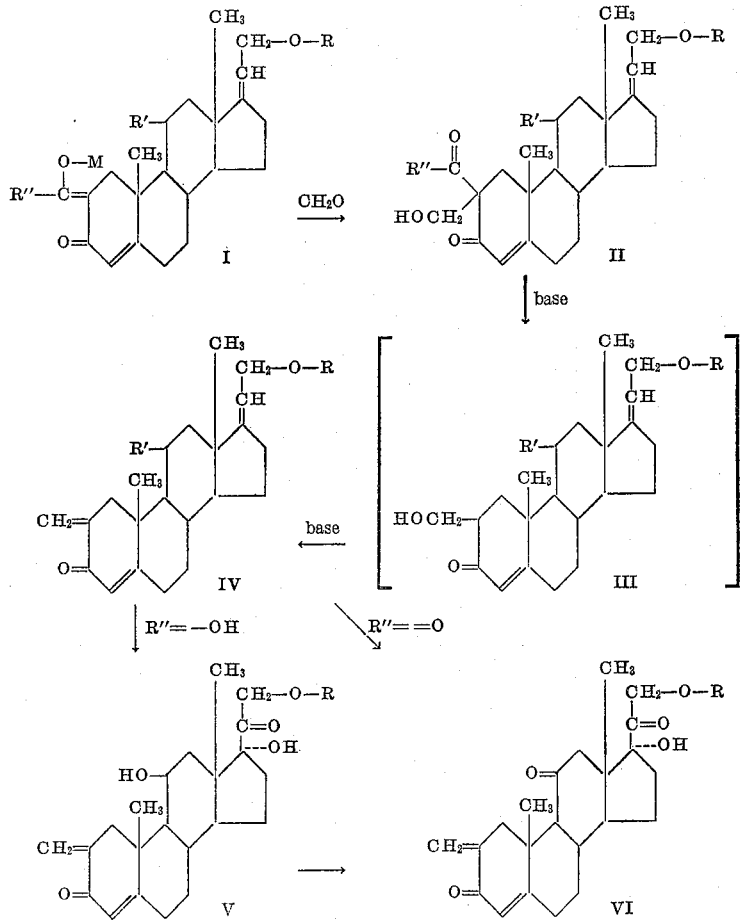

wherein R is hydrogen or the acyl radical of an organic carboxylic acid, preferably a hydrocarbon carboxylic acid containing from one to twelve carbon atoms, inclusive, R' is α-hydroxy, β-hydroxy or keto and R" is hydrogen, lower-alkoxy, trifluoromethyl or carbo-lower-alkoxy and M is an alkali metal, i. e., sodium, potassium or lithium. The lower-alkoxy groups contain from one to eight carbon atoms, inclusive.

It is an object of the present invention to provide synthetic steroid hormones. Another object is the provision of steroid intermediates readily convertible to these synfourth, esterification, if desired and if the thus-produced compound is a 21-hydroxy compound, to produce a 21-esterified compound (IV); and fifth, oxidative hydroxylation of the Δ¹⁷⁽²⁰⁾ double bond to produce a synthetic steroid hormone (V or VI). Hydrolysis of the 21-ester group, e. g., with aqueous sodium bicarbonate in methanol, of the above-described compounds possessing that group is productive of the corresponding 21-hydroxy compound.

The preparation of 11β,21-dihydroxy-4,17(20)-pregnadien-3-one, 11α,21-dihydroxy-4,17(20)-pregnadien-3-one and 21-hydroxy-4,17(20)-pregnadiene-3,11-dione is disclosed in U. S. Patents 2,695,906, 2,707,184 and 2,715,621, of Hogg et al., by reaction of the selected 11-oxygenated progesterone with about a molar equivalent each of sodium methoxide and diethyl oxalate to produce a sodium enolate of an 11-oxygenated-21-ethoxyoxalylprogesterone which is then brominated with two molar equivalents of bromine to produce an 11-oxygenated-21,21-dibromo-21-ethoxyoxalylprogesterone which is converted, with sodium methoxide and methanol, to a methyl 3-keto-11-oxygenated-4,17(20)-pregnadien-21-oate. If this latter reaction is performed at room temperature, the 17(20) double bond of the reaction product has predominantly the [cis] stereoconfiguration whereas if the reaction is heated, e. g., refluxed, significant amounts of the [trans] stereoisomer are produced. Reaction of the thus-produced methyl 3-keto-11-oxygenated-4,17(20)-pregnadien-21-oate with ethylene glycol to produce the 3-ketal thereof and then reducing the 21-carbonyl group with lithium aluminum hydride followed by the hydrolysis with acid of the 3-ketal group is productive of an 11α,21- and/or 11β,21-dihydroxy-4,17(20)-pregnadien-3-one. Esterification of the 21-hydroxy group of 11β,21-dihydroxy-4,17(20)-pregnadien-3-one followed by oxidation of the 11β-hydroxy group with chromic acid or N-bromoacetamide in pyridine is productive of 21-acyloxy-4,17(20)-pregnadiene-3-11-dione which is hydrolyzed with sodium hydroxide to 21-hydroxy-4,17(20)-pregnadiene-3,11-dione.

The novel synthetic hormones of the present invention (V and VI), especially 2-methylene-11β,17α,21-trihydroxy-4-pregnene-3,20-dione and its 21-acetate and other 21-esters possess unusually high anti-inflammatory activity but, surprisingly, do not possess a significant amount of glucocorticoid activity, which activity was heretofore believed to be an indication of anti-inflammatory activity. This highly desirable specificity of activity permits long term treatment of inflammatory conditions of skin and mucous membrane due to contact dermatitis, allergic reactions and many bacterial and fungal infections without the concommitant production of side-effects resulting from the glucocorticoid activity possessed by, for example, cortisone and hydrocortisone, and their esters.

These novel synthetic steroids (V and VI) are especially useful in creams, ointments and lotions commonly used for application to the skin and in ophthalmic conditions, to which can also be added an antibiotic, e. g., neomycin, bacitracin, tetracycline, etc.

CONDENSATION

The condensation step involves the condensation of an alkali-metal salt of a 2-carbonyl-21-oxy-4,17(20)-pregnadien-3-one represented by Formula I with formaldehyde. Ordinarily aqueous formaldehyde is employed and the reaction solvent is a lower-alkanol, preferably methanol or ethanol, or water, or a mixture thereof. The preferred reaction temperature is between zero and fifty degrees centigrade. Room temperature is conveniently used. The reaction temperature somewhat affects the time required for complete reaction; a reaction time of less than an hour is ordinarily required. Usually an excess of formaldehyde is employed. As the reaction mixture is substantially alkaline, hydrolysis of any acid ester groups present in the starting steriod molecule may occur as a side reaction to a greater or lesser degree depending, in part, upon the reaction time, temperature and the ester group. However, as strong hydrolysis conditions are employed in the next step, any ester groups remaining after the condensation step are ordinarily removed in the next step. The preferred starting steriod for the condensation step is the sodium enolate of 2-methoxyoxalyl-11β,21-dihydroxy-4,17(20)-[cis]-pregnadien-3-one or the sodium enolate of 2-ethoxyoxalyl-4,17(20)-[cis]-pregnadien-3-one.

The reaction product is a 2-carbonyl-2-hydroxymethyl-21-oxy-4,17(20)-pregnadien-3-one represented by Formula II. Ordinarily, because of its relative instability, the reaction product of the condensation step is not isolated but is employed, in situ, as the starting material for the next step.

REVERSAL

The reversal step of the present invention involves the removal of the carbonyl, i. e., formyl, carboalkoxy, trifluoroacetyl or alkoxyoxalyl, group from the 2-position leaving the hydroxymethyl group at the 2-position, thus producing a 2-hydroxymethyl-21-oxy-4,17(20)-pregnadien-3-one represented by Formula III. However, the same conditions which ordinarily affect the removal of the carbonyl group also cause the dehydration of the 2-hydroxymethyl group, thereby resulting in the protection of a 2-methylene group. The intermediately produced 2-hydroxymethyl compound of Formula III is therefore not usually isolated but is converted in situ to a 2-methylene compound.

The reversal step is produced by the alkali-metal alkylation catalysts in the presence of water or a lower-alkanol, i. e., the reversal is promoted by the presence of hydroxide or alkoxide ions, particularly hydroxide, methoxide and ethoxide ions. Preferred as reversal-promoting agents are the aqueous alkali-metal bases, e. g., sodium hydroxide or potassium carbonate.

In the reversal reaction, if the 21-oxy group of the steroids involved is an acyloxy group, this group may, depending upon its ease of hydrolysis, be converted to a 21-hydroxy group. For this reason, the 21-hydroxy compounds are preferred as there is no concommitant hydrolysis complicating the reaction.

The reversal reaction is ordinarily conducted at between about zero and about 100 degrees centigrade. At the higher temperatures, the reaction is usually substantially complete within a few hours, e. g., less than eight hours.

The resulting product, i. e., 2-methylene-11β,21-dihydroxy-4,17(20)-[cis]-pregnadien-3-one, 2-methylene-11α,21-dihydroxy-4,17(20)-[cis]-pregnadien-3-one, 2-methylene-21-hydroxy-4-,17(20)-[cis]-pregnadiene-3,11-dione, or preferably a 21-ester thereof, is then oxidatively hydroxylated with a metal oxide and an oxidizing agent. Osmium tetroxide is the metal oxide of choice. Of the oxidizing agents, the more efficient are hydrogen peroxide, the aryl iodoso acetates, and the tertiary amino oxide peroxides (prepared by the reaction of a tertiary amine with two molar equivalents of anhydrous hydrogen peroxide or by the reaction of a tertiary amine oxide with one molar equivalent of hydrogen peroxide). In this reaction, the preferred starting steroids are the 21-acyloxy steroids which ordinarily produce higher yields of 17α-hydroxy-20-keto steriods than do the corresponding 21-hydroxy compounds.

Treatment of a 2-methylene-11β,17α,21-trihydroxy-4-pregnene-3,20-dione, a 2-methylene-11α,17α,21-trihydroxy-4-pregnene-3,20-dione, a 2-methylene-17α,21-dihydroxy-4-pregnene-3,11,20-trione, or a 21-ester thereof, preferably a hydrocarbon carboxylic acid ester thereof, e. g., acetate, with palladium catalyst results in the migration of the double bond at the 2-position to the 1(2)-position thus producing the corresponding Δ$^{1,4}$-2-methyl-3-ketosteroid, e. g., 2-methyl-11β,17α-dihydroxy-21-acetoxy-1,4-pregnadiene-3,20-dione. These Δ$^{1,4}$-compounds also possess marked anti-inflammatory activity and are useful topically in replacement of cortisone or hydrocortisone in formulations now in use.

The following preparations and examples are illustrative of the process and products of the present invention, but are not to be construed as limiting.

PREPARATION 1

*The sodium enolate of 2-methoxyoxalyl-11β-hydroxy-21-acetoxy-4,17(20)-[cis]-pregnadien-3-one*

A solution of 18.62 grams (0.05 mole) of 11β-hydroxy-21 - acetoxy - 4,17(20) - [cis]-pregnadien-3-one was prepared in 300 milliliters of dry tertiary butyl alcohol by heating the mixture at seventy degrees centigrade. The solution was cooled to 55 degrees centigrade and to the stirred solution, protected from atmospheric oxygen by bubbling nitrogen therethrough, was added 11.5 grams (0.10 mole) of methyl oxalate followed by a solution of 4.05 grams (0.075 mole) of sodium methoxide dissolved in sixteen milliliters of methanol. A thick, pale yellow precipitate soon appeared. Stirring was continued for ten minutes and the mixture was then diluted with 300 milliliters of anhydrous ether. Stirring was continued for an additional fifteen minutes and the mixture then filtered. The pale yellow-green precipitate was washed and dried at room temperature in a vacuum. The yield of about 24 grams of precipitate consisted primarily of the sodium enolate of 2-methoxyoxalyl-11β-hydroxy-21-acetoxy-4,17(20)-[cis]-pregnadien-3-one.

Following the procedure described in Preparation 1, the sodium enolate of other 2-methoxyoxalyl-11β-hydroxy - 21 - acyloxy-4,17(20)-[cis]-pregnadien-3-one are prepared by substituting the corresponding 21-ester of 11β,21-dihydroxy-4,17(20)-pregnadien-3-one as the starting steroid of the reaction described in Preparation 1. Examples of the sodium enolate of 2-methoxyoxalyl-11β-hydroxy - 21 - acyloxy - 4,17(20) - [cis] - pregnadien - 3-ones thus prepared include those wherein the acyl group is the acyl radical of a hydrocarbon carboxylic acid containing from one to twelve carbon atoms, inclusive, preferably a lower-aliphatic acid containing from one to eight carbon atoms, inclusive, e. g., formic, propionic, butyric, isobutyric, valeric, isovaleric, trimethylacetic, hexanoic, diethylacetic, triethylacetic, octanoic, or other aryl, alkaryl, aralkyl or cycloalkyl, acids, e. g., benzoic, naphthoic, phenylacetic, 2,4,6-triethylbenzoic, cyclopentylformic.

Similarly, other 2-alkoxyoxalyl-11β-hydroxy-21-acyloxy-4,17(20)-pregnadien-3-ones are prepared by the reaction of 11β,21-dihydroxy-4,17(20)-[cis]-pregnadien-3-one or selected 21-ester thereof with a di-lower-alkyl ester of oxalic acid, e. g., diethyl oxalate, dipropyl oxalate, methyl propyl oxalate, methyl butyl oxalate, methyl amyl oxalate, methyl hexyl oxalate, methyl heptyl oxalate, methyl octyl oxalate, etc.

PREPARATION 2

*The sodium enolate of 2-formyl-11β-hydroxy-21-acetoxy-4,17(20)-[cis]-pregnadien-3-one*

A mixture of 150 milliliters of dry benzene and a solution of 8.10 grams (0.015 mole) of sodium methoxide in 33 milliliters of methanol was distilled in a nitrogen atmosphere until sixty milliliters of distillate was collected. The remaining suspension of sodium methoxide in benzene was cooled to fifty degrees centigrade and 18.5 grams (0.25 mole) of ethyl formate was then added. After stirring the mixture for fifteen minutes, a solution of 3-keto-11β-hydroxy-21-acetoxy-4,17(20)-[cis]-pregnadien-3-one in 300 milliliters of dry benzene at fifty degrees centigrade was rapidly added thereto. The temperature of the mixture was gradually reduced to about 25 degrees centigrade while stirring was continued for one hour. There was then added 250 milliliters of anhydrous ether followed by further stirring for an additional hour whereafter another 250-milliliter portion of ether was added and the mixture was maintained at about 25 degrees centigrade for about sixteen hours. The resulting precipitate, consisting essentially of the sodium enolate of 2-formyl-11β-hydroxy-21-acetoxy-4,17(20)-[cis]-pregnadien-3-one first appeared as a gum but solidified upon standing.

Following the procedure described in Preparation 2, the sodium enolate of 2-formyl-11β,21-dihydroxy-4,17(20)-[cis]-pregnadien-3-one and 21-acyloxy esters thereof are prepared by substituting the 11β,21-dihydroxy-4,17(20)-[cis]-pregnadien-3-one or a 21-acyloxy ester thereof, respectively, as the starting steriod of the reaction described in Preparation 2. Examples of the sodium enolate of 2-formyl-11β-hydroxy-21-acyloxy-4,17(20)-[cis]-pregnadien-3-ones thus prepared include those wherein the acyl group is the acyl radical of a lower-aliphatic acid, e. g., formic, propionic, butyric, isobutyric, valeric, isovaleric, trimethylacetic, hexanoic, diethylacetic, triethylacetic, octanoic, etc., or another acid named in the paragraph following Example 3.

PREPARATION 3

*The sodium enolate of 2-carboethoxy-11β-hydroxy-21-acetoxy-4,17(20)-[cis]-pregnadien-3-one*

Following the procedure described in Preparation 1, the sodium enolate of 2-carbomethoxy-11β-hydroxy-21-acetoxy-4,17(20)-[cis]-pregnadien-3-one is produced by the reaction of 11β-hydroxy-21-acetoxy-4,17(20)-[cis]-pregnadien-3-one with diethyl carbonate in the presence of sodium hydride as condensation catalyst. Similarly, substituting ethyl chloroformate is productive of the same product.

Substituting methyl or ethyl trifluoroacetate for the dimethyl oxalate employed in Preparation 1 is productive of the sodium enolate of 2-(trifluoroacetyl)-11β-hydroxy-21-acetoxy-4,17(20)-[cis]-pregnadien-3-one.

PREPARATION 4

*The sodium enolate of 2-methoxyoxalyl-11β,21-dihydroxy-4,17(20)-[cis]-pregnadien-3-one*

Following the procedure described in Preparation 1, but substituting 11β,21-dihydroxy-4,17(20)-[cis]-pregnadien-3-one as the starting steroid, there is produced the sodium enolate of 2-methoxyoxalyl-11β,21-dihydroxy-4,17(20)-[cis]-pregnadien-3-one.

Similarly, the alkali-metal enolate of other 2-lower-alkoxyoxalyl - 11β,21 - dihydroxy - 4,17(20) - [cis]-pregnadien-3-ones are prepared by the reaction of 11β,21-dihydroxy-4,17(20)-[cis]-pregnadien-3-one with the selected lower-alkyl diester of oxalic acid and alkali-metal condensation catalyst, wherein at least one of the alkyl groups of the dialkyl ester of oxalic acid corresponds to the alkyl group of the thus-produced alkoxyoxalyl group. 2 - formyl - 11β,21 - dihydroxy - 4,17(20) - [cis]-pregnadien-3-one and 2-carbo-lower-alkoxy-11β,21-dihydroxy-4,17(20)-[cis]-pregnadien-3-one are prepared by substituting, respectively, a lower-alkyl ester of formic acid and a lower-alkyl ester of carbonic acid for the dimethyl oxalate in the reaction described above.

Other alkali-metal enolates are prepared by the reaction of a solution of the free enol of a 2-lower-alkoxyoxalyl-11β,21-dihydroxy-4,17(20)-[cis]-pregnadien-3-one or 21-ester thereof with a solution of an alkaline alkali-metal compound, e. g., potassium hydroxide, potassium tertiary butoxide, lithium hydroxide, lithium methoxide, etc., or by substituting potassium tertiary butoxide, lithium methoxide or other alkali-metal base condensation catalyst in the reactions described in Preparations 1 to 4.

PREPARATION 5

*The sodium enolate of 2-methoxyoxalyl-21-hydroxy-4,17(20)-[cis]-pregnadiene-3,11-dione*

Following the procedure of Preparation 1, but substituting an equivalent weight of 21-hydroxy-4,17(20)-[cis]-pregnadiene-3,11-dione as the starting steroid, there is thus produced the sodium enolate of 2-methoxyoxalyl-21-hydroxy-4,17(20)-[cis]-pregnadiene-3,11-dione.

Similarly, substituting 21-acyloxy-4,17(20)-[cis]-pregnadiene-3,11-dione wherein the acyl radical is that of an organic carboxylic acid, preferably a hydrocarbon carboxylic acid containing from one to twelve carbon atoms, inclusive, as the starting steroid in the reaction of Preparation 1, there is produced the sodium enolate of 2 - methoxyoxalyl - 21 - acyloxy - 4,17(20) - [cis] - pregnadiene-3,11-dione, e. g., wherein the acyloxy radical is formyloxy, acetoxy, propionyloxy, butyryloxy, valeryloxy, isovaleryloxy, trimethylacetoxy, hexanoyloxy, diethylacetoxy, triethylacetoxy, octanoyloxy, benzoxy, naphthoxy, phenylacetoxy, 2,4,6-trimethylbenzoxy, cyclopentylformyloxy, cyclopentylproprionyloxy, etc., or other acyloxy radical resulting from an ester of an acid named in the paragraph following Example 3.

Substituting 21-hydroxy-4,17(20)-[cis]-pregnadiene-3,11-dione for the 11β,21-dihydroxy-4,17(20)-[cis]-pregnadien-3-one employed as the starting steroid in Preparations 1 to 5 is productive of the corresponding 2-carbonyl steroid wherein the 11-substituent is a keto group.

Substituting 11α,21 - dihydroxy-4,17(20)-[cis]-pregnadien-3-one for the 11β,21-dihydroxy-4,17(20)-[cis]-pregnadien-3-one employed as the starting steroid in Preparations 1 to 5 is productive of the corresponding 2-carbonyl steroid wherein the 11-substituent is an α-hydroxy group.

EXAMPLE 1

*2-methylene-11β,21-dihydroxy-4,17(20)-[cis]-pregnadien-3-one*

To twelve milliliters of forty percent aqueous formaldehyde was added dropwise a solution of four grams of the sodium enolate of 2-ethoxyoxalyl-11β,21-dihydroxy-4,17(20)-[cis]-pregnadien-3-one in thirty milliliters of water. During the addition, the mixture became a thick slurry. After stirring for five minutes, two grams of potassium carbonate was added to the thus-produced mixture containing 2-ethoxyoxalyl-2-hydroxymethyl-11β,21-dihydroxy-4,17(20) - [cis] - pregnadien-3-one and the whole heated to sixty degrees centigrade. After allowing the mixture to cool to room temperature, 100 milliliters of methylene chloride was added thereto and stirring was continued for two hours. After adding a small amount of sodium chloride to break the resulting emulsion, the layers were separated. The aqueous layer was extracted with 100 milliliters of methylene chloride which was then added to the methylene chloride layer. The combined methylene chloride solutions were washed with water, dried and poured over a 200 gram column of Florisil synthetic magnesium silicate. The column was developed with 200-milliliter portions of solvents of the following composition and order: eleven of Skellysolve B hexane hydrocarbons plus fifteen percent acetone, nine of Skellysolve B plus twenty percent acetone, and one of acetone. The second through sixth Skellysolve B plus acetone eluates were combined and stripped of solvent, leaving 712 milligrams of crystalline 2-methylene-11β,21-dihydroxy-4,17(20)-[cis]-pregnadien-3-one which, when crystallized from a mixture of acetone and Skellysolve B, melted at 162 to 165 degrees centigrade, had an $[\alpha]_D$ of plus 106 degrees in acetone and the analysis below.

Calculated for $C_{22}H_{30}O_3$: C, 77.15; H, 8.82. Found: C, 77.15; H, 8.82.

Following the procedure of Example 1 exactly, but substituting 2-methoxyoxalyl-11β,21-dihydroxy-4,17(20)-[cis]-pregnadien-3-one as the starting steroid also results in the production of 2-methylene-11β,21-dihydroxy-4,17(20)-[cis]-pregnadien-3-one. Similarly, substituting another 2-lower-alkoxyoxalyl - 11β,21 - dihydroxy-4,17(20)-[cis]-pregnadien-3-one wherein the lower-alkoxy group is propoxy, butoxy, amyloxy, hexyloxy, heptyloxy, octyloxy, or 2-formyl-11β,21-dihydroxy-4,17(20)-[cis]-pregnadien-3-one, or 2-carbo-lower-alkoxy-11β,21-dihydroxy-4,17(20)-[cis]-pregnadien-3-one wherein the lower-alkoxy group is methoxy, ethoxy, propoxy, butoxy, amyloxy, hexyloxy, heptyloxy, octyloxy, or 2-trifluoroacetyl-11β,21-dihydroxy-4,17(20)-[cis]-pregnadien-3-one, as the starting steroid in the reaction described in Example 1, also results in the production of 2-methylene-11β,21-dihydroxy-4,17(20)-[cis]-pregnadien-3-one.

Substituting the 11α-isomer of any of the above-named starting compounds results in the production of 2-methylene-11α,21-dihydroxy-4,17(20)-[cis]-pregnadien-3-one.

EXAMPLE 2

*2-methylene-21-hydroxy-4,17(20)-[cis]-pregnadiene-3,11-dione*

Following the procedure of Example 1, but substituting 21-hydroxy-4,17(20)-[cis]-pregnadiene-3,11-dione as the starting steroid, there is thus-produced 2-methylene-21-hydroxy-4,17(20)-[cis]-pregnadiene-3,11-dione. Similarly, substituting the 11-keto compound otherwise corresponding to any of the starting steroids named in the paragraph following Example 1, as the starting steroid in Example 1, results in the production of 21-hydroxy-4,17(20)-[cis]-pregnadiene-3,11-dione.

EXAMPLE 3

*2-methylene-11β-hydroxy-21-acetoxy-4,17(20)-[cis]-pregnadien-3-one*

A mixture of 2.23 grams of 2-methylene-11β,21-dihydroxy-4,17(20)-[cis]-pregnadien-3-one, fifteen milliliters of acetic anhydride and thirty milliliters of pyridine was maintained at room temperature for three hours. The acetylation mixture was then decomposed by the addition of a mixture of thirty milliliters of concentrated hydrochloric acid in 100 milliliters of ice water and the whole was then extracted with methylene chloride. The extract was washed with water followed by a saturated aqueous solution of sodium bicarbonate, freed of solvent, redissolved in 300 milliliters of methylene chloride and the solution poured over a 300 grams column of Florisil synthetic magnesium silicate. The column was developed with 300-milliliter portions of solvent of the following composition and order: ten of Skellysolve B plus ten percent acetone and two of acetone. The third through sixth Skellysolve B plus ten percent acetone eluate fractions were freed of solvent. The combined residues weighed 1.79 grams and consisted of 2-methylene-11β-hydroxy-21-acetoxy-4,17(20)-[cis]-pregnadien-3-one which, after crystallization from acetone, was obtained as white needles melting at 145 to 147 degrees centigrade, having a $$\lambda^{max.}_{EtOH}$$

of 262 mmu., and $[\alpha]_D$ of plus 136 degrees in acetone and the analysis below.

Calculated for $C_{24}H_{32}O_4$: C, 74.96; H, 8.37. Found: C, 75.00; H, 8.20.

Similarly, 2-methylene - 11β,21 - dihydroxy - 4,17(20)-[cis]-pregnadien-3-one is converted to other 2-methylene-11β - hydroxy - 21 - acyloxy-4,17(20)-[cis]-pregnadien-3-ones by esterification of the 21-hydroxy group, e. g., by reaction with the appropriate acid anhydride, acid chloride or bromide, ester by ester exchange, acid in the presence of an esterification catalyst, etc. Examples of 2-methylene-11β-hydroxy-21-acyloxy - 4,17(20)-[cis]-pregnadien-3-one prepared include those wherein the acyl group is the acyl radical of, for example, a lower-aliphatic acid, e. g., formic, propionic, butyric, isobutyric, valeric, isovaleric, trimethylacetic, 2-methylbutyric, 3-ethylbutyric, hexanoic, diethylacetic, triethylacetic, heptanoic, octanoic, α-ethylisovaleric, an acyclic acid, e. g., 3β-hydroxycholanic, 3β-hydroxyetiocholanic, cyclopropylideneacetic, a cycloaliphatic acid, e. g., cyclopentylformic, cyclopentylacetic, β-cyclopentylpropionic, cyclohexylformic, cyclohexylacetic, β-cyclohexylpropionic, an aryl or alkaryl acid, e. g., benzoic, 2,3 or 4-methylbenzoic, 2,3-, 2,4-, 2,5-, 2,6-, 3,4- and 3,5-dimethylbenzoic, ethylbenzoic, 2,4,6-trimethylbenzoic, 2,4,6-triethylbenzoic, α-naphthoic, 3-methyl-α-naphthoic, an aralkyl acid, e. g., phenylacetic, phenylpropionic, diphenylacetic, triphenylacetic, etc.

Example 4

2-methylene-21-acetoxy-4,17(20)-[cis]-pregnadiene-3,11-dione

Following the procedure of Example 3, but substituting 2-methylene-21-hydroxy-4,17(20)-[cis]-pregnadiene-3,11-dione as the starting steroid, there is thus produced 2-methylene-21-acetoxy-4,17(20) - [cis] - pregnadiene-3,11-dione.

Other 2-methylene-21-acyloxy-4,17(20)-[cis]-pregnadiene-3,11-diones are prepared in exactly the same manner as described in the paragraph following Example 3 by substituting 2-methylene-21-hydroxy-4,17(20)-[cis]-pregnadiene-3,11-dione in the esterification reactions described therein, producing, for example, esters wherein the acyl radical is that of an acid named therein.

In the reactions described in the preceding examples, the [trans] isomer of the compounds produced as reaction products is prepared by substituting as starting steroid the [trans] isomer of the compound employed in the example as starting steroid.

Similarly, the [trans] isomers of the compounds employed as starting steroids in the oxidative hydroxylation reactions described hereinafter may also be employed as starting steroids, although the yield of 17α-hydroxy-20-keto steroid thus produced is somewhat lower when the [trans] isomer is employed.

Example 5

2-methylene-11β,17α,dihydroxy-21-acetoxy-4-pregnene-3,20-dione

To a solution of 1.15 grams of 2-methylene-11β-hydroxy-21-acetoxy-4,17(20)-[cis] - pregnadien-3-one and 0.6 milliliter of pyridine in 55 milliliters of dry tertiary butyl alcohol was added 5.4 milliliters of a solution of N-methylmorpholine oxide peroxide in anhydrous tertiary butyl alcohol (titrating 30.7 milliliters of 0.1 NaS₂O₃/milliliter). To the resulting mixture was then added 0.019 gram of osmium tetroxide in thirteen milliliters of anhydrous tertiary butyl alcohol. After stirring the resulting mixture for three hours, one gram of magnesol filter aid and twenty milliliters of 0.5 percent aqueous sodium hydrosulfite were added thereto and stirring was continued for one half hour. The mixture was filtered and the filter cake washed with ten milliliters of fifty percent aqueous tertiary butyl alcohol. The combined filtrates were concentrated at reduced pressure to a volume of thirty milliliters and the product dissolved therein precipitated as an oil by the dropwise addition of forty milliliters of water. The oil was extracted with methylene chloride which was then evaporated, leaving 1.11 grams of an oil. The oil was dissolved in 200 milliliters of methylene chloride which was poured over a column of 100 grams of Florisil synthetic magnesium silicate. The column was developed with 200-milliliter portions of solvent of the following composition and order: six of Skellysolve B hexane hydrocarbons plus twelve percent acetone, seven of Skellysolve B plus twenty percent acetone and one of acetone. The first three Skellysolve B plus twenty percent acetone eluates contained 0.14 gram of 2-methylene-11β,17α-dihydoxy-21-acetoxy-4-pregnene-3,20-dione which, when crystallized from acetone, melted at 222 to 225 degrees centigrade, gave a strong Tollen's test, had a $$\lambda_{\text{EtOH}}^{\text{max.}}$$

of 262 mmu., and the analysis below.

Calculated for $C_{24}H_{32}O_6$: C, 69.21; H, 7.75. Found: C, 68.89; H, 7.67.

Example 6

2-methylene-11β,17α,21-trihydroxy-4-pregnene-3,20-dione

A solution of 2-methylene-11β,17α,21-trihydroxy-4-pregnene-3,20-dione in methanol was freed of oxygen gas by bubbling nitrogen therethrough. A solution of 1.0 N potassium bicarbonate was similarly freed of oxygen. The two solutions were mixed in molar proportions of one of the former to ten of the latter at a temperature of between eighteen and twenty degrees centigrade and in a nitrogen atmosphere. The mixture was stirred at room temperature for five hours while protecting it from atmospheric oxygen with nitrogen. Thereupon the solution was neutralized by the addition of a solution of glacial acetic acid. The neutralized solution was concentrated by distillation at room temperature at reduced pressure and 2-methylene-11β,17α,21-trihydroxy-4-pregnene-3,20-dione recovered by crystallization from the mother liquor.

Example 7

2-methylene-11β,17α,dihydroxy-21-acetoxy-4-pregnene-3,20-dione

Following the procedure of Example 3, but substituting an equivalent weight of 2-methylene-11β,17α,21-trihydroxy-4-pregnene-3,20-dione for the 2-methylene-11β,21-dihydroxy-4,17(20)-[cis]-pregnadien - 3 - one employed therein as starting steroid, there is thus produced 2-methylene-11β,17α-dihydroxy-21-acetoxy-4-pregnene- 3,20 - dione as the reaction product.

Similarly, 2-methylene-11β,17α,21-trihydroxy-4 - pregnene-3,20-dione is converted to other 2-methylene-11β,17α-dihydroxy-21-acyloxy-4-pregnene-3,20-diones by esterification of the 21-hydroxy group, e. g., by reaction with the appropriate acid anhydride, acid bromide, ester by ester exchange, acid in the presence of an esterification catalyst, etc. Included among the esters thus produced are the 2-methylene-11β,17α-dihydroxy-21-acyloxy-4-pregnene-3,20-diones wherein the acyl group is the acyl radical of, for example, a lower-aliphatic acid, e. g., formic, propionic, butyric, isobutyric, valeric, isovaleric, trimethylacetic, 2-methylbutyric, 3-ethylbutyric, hexanoic, diethylacetic, triethylacetic, heptanoicc, octanoic, α-ethylisovaleric, an acyclic acid, e. g., 3β-hydroxycholanic, 3β-hydroxyetiocholanic, cyclopropylideneacetic, a cycloaliphatic acid, e. g., cyclopentylformic, cyclopentylacetic, β-cyclopentylpropionic, cyclohexylformic, cyclohexylacetic, β-cyclohexylpropionic, an aryl or alkaryl acid, e. g., benzoic, 2, 3, or 4-methylbenzoic, 2,3-, 2,4-, 2,5-, 2,6-, 3,4- and 3,5-dimethylbenzoic, ethylbenzoic, 2,4,6-trimethylbenzoic, 2,4,6-triethylbenzoic, α-naphthoic, 3-methyl-α-naphthoic, an aralkyl acid, e. g., phenylacetic, phenylpropionic, diphenylacetic, triphenylacetic, a dibasic acid (which can be converted to water soluble, e. g., sodium, salts), e. g., succinic, glutaric, α-methylglutaric, β-methylglutaric, β,β-dimethylglutaric, adipic, pimelic, suberic, a hydroxy acid, e. g., glycolic, lactic, citric, tartaric, d-maleic, d-glyceric, mannonic, gluconic, salicylic, an amino acid, e. g., glycine, diglycollamic, triglycollamic, methylglycine, dimethylglycine, diethylglycine, para-aminosalicylic, para-aminobenzoic, other hetero-substituted acids, e. g., ethylmercaptoacetic, benzylmercaptoacetic, cyanoacetic, chloroacetic, fluoroacetic, trichloroacetic, trifluoroacetic, thioglycolic, 2,3,4-trimethoxybenzoic, α-naphthoxyacetic, β-pyrrolidylpropionic, carbamic acids, e. g., carbamic acid, phenylcarbamic, n-butylcarbamic, dimethylcarbamic, diethylcarbamic, allophanic, or a heterocyclic acid, e. g., β-furylcarboxylic, N-methylpyrrolidyl-2-carboxylic, α-picolinic, indole-2-carboxylic, 6-hydroxyindolyl-3-acetic, N-methylmorpholyl-2-carboxylic, lysergic, pyrrolyl-2-carboxylic, or other acyl acid.

Oxidation of one of these 2-methylene-11β,17α-dihydroxy-21-acyloxy-4-pregnene-3,20-diones, e. g., with N-bromoacetamide in pyridine or chromium trioxide in acetic acid, is productive of a 2-methylene-17α-hydroxy-21-acyloxy-4-pregnene-3,11,20-trione wherein the acyl radical is that of an acid named in the preceding paragraph. In this oxidation, the 21-acyl radical is preferably that of a hydrocarbon carboxylic acid, e. g., acetic acid, as these radicals are ordinarily unaffected by the oxidation reaction.

Alternatively, 2-methylene-17α-hydroxy-21-acyloxy-4-pregnene-3,11,20-triones are prepared by substituting 2-methylene-17α,21-dihydroxy-4-pregnene-3,11,20-trione as the starting steroid in the reaction described in Example 3 or in an esterification reaction described in the paragraph immediately following Example 3.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:

1. 2-methylene-21-oxy-4,17(20)-pregnadien-3-one represented by the following formula:

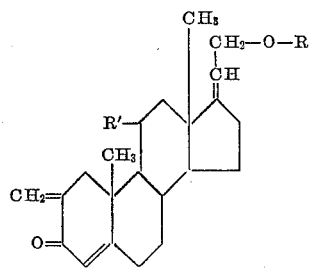

wherein R is selected from the group consisting of hydrogen and the acyl radical of a hydrocarbon carboxylic acid containing from one to twelve carbon atoms, inclusive, and wherein R' is selected from the group consisting of hydroxy and keto.

2. 2-methylene-11β,21-dihydroxy-4,17(20)-[cis]-pregnadien-3-one.

3. 2-methylene-11β-hydroxy-21-acyloxy-4,17(20)-[cis]-pregnadien-3-one wherein the acyl radical is that of a hydrocarbon carboxylic acid containing from one to twelve carbon atoms, inclusive.

4. 2-methylene-11β-hydroxy-21-acetoxy-4,17(20)-[cis]-pregnadien-3-one.

5. 2-methylene-11β,17α-dihydroxy-21-oxy-4-pregnene-3,20-dione represented by the following formula:

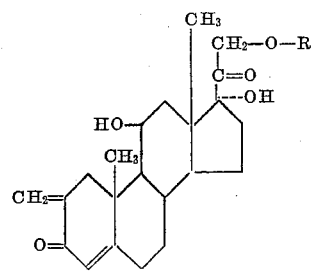

wherein R is selected from the group consisting of hydrogen and the acyl radical of a hydrocarbon carboxylic acid containing from one to twelve carbon atoms, inclusive.

6. 2-methylene-11β,17α-dihydroxy-21-acyloxy-4-pregnene-3,20-dione wherein the acyl radical is that of a hydrocarbon carboxylic acid containing from one to twelve carbon atoms, inclusive.

7. 2-methylene-11β,17α-dihydroxy-21-acetoxy-4-pregnene-3,20-dione.

8. 2-methylene-11β,17α,21-trihydroxy-4-pregnene-3,20-dione.

9. 2-methylene-17α-hydroxy-21-oxy-4-pregnene-3,11,20-trione represented by the following formula:

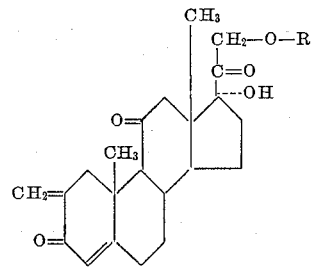

wherein R is selected from the group consisting of hydrogen and the acyl radical of a hydrocarbon carboxylic acid containing from one to twelve carbon atoms, inclusive.

10. 2-methylene-17α-hydroxy-21-acyloxy-4-pregnene-3,11,20-trione wherein the acyl radical is that of a hydrocarbon carboxylic acid containing from one to twelve carbon atoms, inclusive.

11. 2-methylene-17α-hydroxy-21-acetoxy-4-pregnene-3,11,20-trione.

12. The process which comprises the steps of first, condensing aqueous formaldehyde with the alkali-metal enolate of 2-carbonyl-21-oxy-4,17(20)-pregnadien-3-one, represented by the following formula:

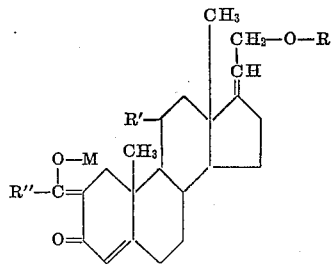

wherein R is selected from the group consisting of hydrogen and the acyl radical of an organic carboxylic acid, wherein R' is selected from the group consisting of hydroxy and keto, wherein R'' is selected from the group consisting of hydrogen, carbo-lower-alkoxy, lower-alkoxy and trifluoromethyl, and wherein M is an alkali-metal, to produce a 2-hydroxymethyl-2-carbonyl steroid; and reacting the thus-produced 2-hydroxymethyl-2-carbonyl steroid with an aqueous alkali-metal base to produce a 2-methylene-21-oxy-4,17(20)-pregnadien-3-one represented by the following formula:

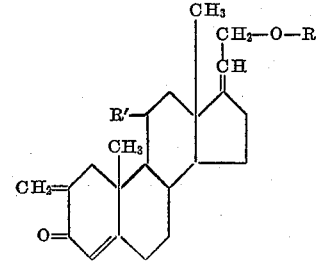

wherein R and R' have the values given hereinbefore.

13. The process of claim 12 wherein the aqueous alkali-metal base is an alkali-metal carbonate.

14. The process which comprises the steps of condensing aqueous formaldehyde with the alkali-metal enolate of 2-lower-alkoxyoxalyl-11β,21-dihydroxy-4,17(20)-[cis]-pregnadien-3-one represented by the following formula:

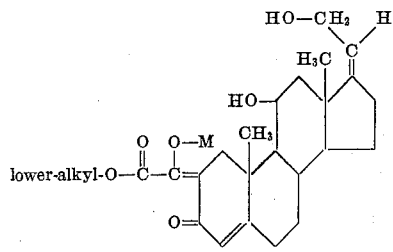

wherein M is an alkali-metal, to produce 2-lower-alkoxy-oxalyl-2-hydroxymethyl-11β,21-dihydroxy-4,17(20)-[cis]-pregnadien-3-one and reacting said compound with aqueous alkali-metal carbonate to produce 2-methylene-11β,21-dihydroxy-4,17(20)-[cis]-pregnadien-3-one.

15. The process of claim 14 wherein the lower-alkoxy contains less than three carbon atoms.

References Cited in the file of this patent

UNITED STATES PATENTS 2,695,906   Hogg _____ Nov. 30, 1954

OTHER REFERENCES

Fieser et al.: Natural Products Related to Phenanthrene, 3rd ed., page 407 (1949).